(12) United States Patent
Hartman et al.

(10) Patent No.: US 8,374,327 B2
(45) Date of Patent: Feb. 12, 2013

(54) MANAGEMENT OF CALL HANDLING TREATMENTS

(75) Inventors: Michael Hartman, Kilcolgan (IE); Tom Howley, Galway (IE)

(73) Assignee: Avaya Inc, Basking Ridge, NJ (US)

( * ) Notice: Subject to any disclaimer, the term of this patent is extended or adjusted under 35 U.S.C. 154(b) by 879 days.

(21) Appl. No.: 12/504,830

(22) Filed: Jul. 17, 2009

(65) Prior Publication Data
US 2011/0013765 A1 Jan. 20, 2011

(51) Int. Cl.
*H04M 3/42* (2006.01)
(52) U.S. Cl. .................. 379/201.12; 379/202.01
(58) Field of Classification Search ............. 379/201.01, 379/201.12, 266.06, 265.02
See application file for complete search history.

(56) References Cited

U.S. PATENT DOCUMENTS

| | | | | |
|---|---|---|---|---|
| 5,412,714 A | * | 5/1995 | Bogart et al. | 379/221.14 |
| 8,238,540 B1 | * | 8/2012 | Duva et al. | 379/265.01 |
| 2009/0147937 A1 | * | 6/2009 | Sullhan et al. | 379/201.02 |

* cited by examiner

*Primary Examiner* — Rasha Al Aubaidi
(74) *Attorney, Agent, or Firm* — Barnes & Thornburg LLP

(57) ABSTRACT

The provision of call handling treatments to callers interacting with an automated call-handling system is managed by, for each of a plurality of callers, providing a sequence of call handling treatments to the caller in accordance with workflows; monitoring a measurable performance indicator associated with that caller's behavior; determining an association between the performance indicator and the call handling treatments provided to the caller; and recording the association. Then, based on the recorded associations, the system determines a pattern of deviation in the performance indicator attributable to the call handling treatments; and alters the workflow in response to the deviation by making a change in the workflow selected from promoting a call handling treatment to an earlier point in the workflow; demoting a call handling treatment to a later point in the workflow; adding a call handling treatment to the workflow; and removing a call handling treatment from the workflow.

17 Claims, 5 Drawing Sheets

MANAGEMENT OF CALL HANDLING TREATMENTS

TECHNICAL FIELD

This invention relates to the management of call handling treatments.

BACKGROUND ART

Call handling treatments are used to supply added functionality over and above the normal scenario in which a first caller and second caller are immediately placed in contact with one another. Such treatments are widely used in, for example, contact centers, whereby an inbound call from a customer is provided with a number of sequential treatments, usually prior to connection to a live agent.

For example, the treatments applied to a call may begin with the caller hearing a ring tone, followed by an interactive voice response (IVR) session in which the caller is provided with various recorded announcements and the opportunity to make inputs e.g. by voice or by pressing keys, in order to interactively provide menu choices allowing the contact center to gather date about the call and about the best way of handling the call. If the caller has to subsequently queue to speak to an available agent, additional treatments may be automatically provided to the caller, such as recorded announcements (RAN), music on hold (MOH), advertisements, interactive surveys, and so on. Each of these is an example of a call handling treatment.

Apart from contact centers, such call handling treatments can be provided in the context of almost any call. Thus, a private individual may have telephony software which is configured to automatically handle incoming or outgoing calls, providing music on hold or recorded announcements to callers. The same may be true of the software running on a company's private branch exchange (PBX), where the company may additionally wish to serve advertisements to customers on hold.

Contact centers typically gather statistical data about every contact or communications session involving the contact center. Normally, such statistics are monitored and compared to various benchmarks or key performance indicators (KPIs) in order to ensure that predetermined service levels have been met, or to identify instances where service levels are not being met.

One of the most important service levels operated by most contact centers is a metric based on "within threshold abandons". If a call is abandoned before the caller is connected to a live agent, then the time at which that abandonment occurs can either be within threshold or outside threshold.

If the contact center can automatically deal with the customer in an acceptable period of time without transfer to an agent, then this will be referred to as a within threshold abandon, and such abandonments are typically counted as having a positive influence on service level attainment. The caller might, for example, call a contact center to enquire about or complain about a network problem. If the contact center can provide an informative recorded announcement which answers the caller's concerns, and if this can be played early in the call, then the caller may abandon the call, the question having been answered with no further need to speak with an agent.

Callers who remain on hold for a longer period of time, however, and who abandon their calls outside the threshold time, may be assumed to have done so out of frustration or dissatisfaction with the length of time on hold, and such abandonments are typically viewed as having a negative impact on service level attainment.

Contact centers may be contractually required to provide, on behalf of the client for whom they are operating, a within threshold abandonment rate of (say) 85%, meaning that customers must either be connected to an agent or, if they abandon the call, must do so within threshold (which may be set at perhaps 20-25 seconds) on at least 85% of instances.

Within threshold abandons are, of course, only one key performance indicator. Other indicators which may be monitored are the successful sale of a product to a customer, or the successful selection by a customer of a particular menu option, e.g. where a cable subscriber opts to take on additional pay-per-view services.

The design of call handling treatments is typically relatively static and inflexible. It can be difficult to assess whether the call handling treatments and their sequence as provided to callers is optimal, and typically the selection of a sequencing of call handling treatments is changed only during major redesigns of systems. For new contact centers there may be a long period of change and adjustment before a satisfactory call handling workflow is finalized.

DISCLOSURE OF THE INVENTION

There is provided a computer-implemented method of managing the provision of call handling treatments in sequence to callers interacting with an automated call-handling system, the method comprising the steps of:
 (i) for each of a plurality of callers interacting with said automated call handling system:
  (a) providing a sequence of call handling treatments to the caller in accordance with one or more workflows;
  (b) monitoring a measurable performance indicator associated with that caller's behavior;
  (c) determining an association between said performance indicator and one or more of said call handling treatments provided to said caller; and
  (d) recording said association;
 (ii) based on said recorded associations, determining a pattern of deviation in said performance indicator attributable to one or more of said call handling treatments; and
 (iii) altering the or each workflow in response to said pattern of deviation by making a change in the or each workflow selected from:
  promoting a call handling treatment to an earlier point in the workflow;
  demoting a call handling treatment to a later point in the workflow;
  adding a call handling treatment to the workflow; and
  removing a call handling treatment from the workflow.

The method enables dynamic re-programming of a workflow in direct response to an observed pattern of deviation in a performance indicator which is attributable to one or more of the call handling treatments provided to several callers. The term "caller" as used herein does not exclude call participants who may have received, rather than initiated, a call or communications session.

Preferably said workflow is stored in a memory associated with said call handling system.

The steps of the method are implemented by a computer system, namely an automated call handling system programmed to provide call treatments to callers interacting with that system.

Preferably, in one embodiment, the measurable performance indicator is a time at which a call termination event is detected.

By determining an association between call terminations (or abandons) and one or more of the call handling treatments, the programming of the system may operate to encourage such terminations at an earlier point in a call, by promoting the treatment within the workflow, or one may discourage such terminations by demoting or removing the treatment from the workflow.

In another embodiment, the performance indicator is a metric received from an associated computerised system which interfaces with the call handling system, whereby an event within that associated system is notified to the call handling system and is monitored as a performance indicator.

Examples of such associated systems are the contact center agent applications operated by agents of a contact center to record details of an interaction with the caller. Thus, for example, sales events, or quality monitoring events may be notified as performance indicators, allowing a correlation to be determined between the call handling treatments and the subsequent interaction between caller and agent.

The step of altering the workflow in response to the pattern of deviation may occur immediately after noting such a deviation, or it may take place at a later point in time during a periodic review of the workflows.

There is further provided a computer program product comprising instructions recorded on a program carrier which, when executed in a computerised call handling system, are effective to cause said system to:

(i) for each of a plurality of callers interacting with said automated call handling system:
  (a) provide a sequence of call handling treatments to the caller in accordance with one or more workflows;
  (b) monitor a measurable performance indicator associated with that caller's behavior;
  (c) determine an association between said performance indicator and one or more of said call handling treatments provided to said caller; and
  (d) record said association;
(ii) based on said recorded associations, determine a pattern of deviation in said performance indicator attributable to one or more of said call handling treatments; and
(iii) alter the or each workflow in response to said pattern of deviation by making a change in the or each workflow selected from:
  promoting a call handling treatment to an earlier point in the workflow;
  demoting a call handling treatment to a later point in the workflow;
  adding a call handling treatment to the workflow; and
  removing a call handling treatment from the workflow.

There is also provided a computerised call-handling system for providing call handling treatments in sequence to callers interacting with said system, the system comprising:

(a) a memory storing one or more workflows specifying a sequence of call handling treatments to be provided to each of a plurality of callers interacting with said system;
(b) a call handling treatment server for serving said treatments from storage to said callers in accordance with the one or more workflows;
(c) a performance indicator monitor for monitoring a measurable performance indicator associated with the behavior of the callers;
(d) processing means programmed to determine an association between said performance indicator and one or more of said call handling treatments provided to the callers; (d) a record for recording said association;
(e) processing means programmed to determine from said record a pattern of deviation in said performance indicator attributable to one or more of said call handling treatments; and
(f) a workflow manager operable to alter the or each workflow in response to said pattern of deviation by making a change in the or each workflow selected from:
  promoting a call handling treatment to an earlier point in the workflow;
  demoting a call handling treatment to a later point in the workflow;
  adding a call handling treatment to the workflow; and
  removing a call handling treatment from the workflow.

Preferably the processing means programmed to determine said association, and/or the processing means programmed to determine said pattern of deviation, and/or the workflow manager are each implemented in program steps on one or more general purpose computer systems. A single computer may provide the functionality of each such component, or the components may be distributed among a number of co-operating computer systems.

In a preferred embodiment, said call-handling system provides an interface to callers interacting with a contact center.

There is further provided a computer-implemented method of managing the provision of call handling treatments in sequence to callers interacting with an automated call-handling system, the method comprising the steps of:

(i) for each of a plurality of callers interacting with said automated call handling system:
  (a) providing a sequence of call handling treatments, selected from among a plurality of available sequences of call handling treatments, to the caller;
  (b) monitoring a measurable performance indicator associated with that caller's behavior;
  (c) determining an association between said performance indicator and one or more of said call handling treatments provided to said caller; and
  (d) recording said association;
(ii) based on said recorded associations, determining a pattern of deviation in said performance indicator attributable to one or more of said sequences of call handling treatments; and
(iii) altering the plurality of available sequences of call handling treatments by making a change in the available sequences of treatments selected from:
  promoting a call handling treatment to an earlier point in one or more of said available sequences;
  demoting a call handling treatment to a later point in one or more of said available sequences;
  removing a sequence of call handling treatments from the available sequences;
  adding a call handling treatment to one of said available sequences;
  adding a call handling treatment to one of said available sequences; and
  altering a weighting associated with a sequence of call handling treatments to thereby influence the frequency with which that sequence is selected from among the available sequences.

In this way, a number of possible sequences of call handling treatments can be evaluated against measurable performance indicators, with the results of such measurement being used to automatically alter the future provision of such sequences of treatments.

Preferably, said sequences of treatments are provided as a closed set of treatments, with each caller being provided with a sequence from among said closed set.

The selection of a sequence of call handling treatments for a particular caller may be determined in accordance with a schedule, or may be determined at random.

In either case, the determination can be subject to weightings according to which certain sequences are selected more frequently than others.

Alternatively, the sequences of treatments can be constructed dynamically by amalgamating a number of treatments according to predetermined constraints.

The frequency with which treatments are selected for amalgamation may again be subject to weightings assigned to such treatments.

There is also provided a computer program product comprising instructions recorded on a program carrier which, when executed in a computerised call handling system, are effective to cause said system to:

(i) for each of a plurality of callers interacting with said automated call handling system:
- (a) provide a sequence of call handling treatments, selected from among a plurality of available sequences of call handling treatments, to the caller;
- (b) monitor a measurable performance indicator associated with that caller's behavior;
- (c) determine an association between said performance indicator and one or more of said call handling treatments provided to said caller; and
- (d) record said association;

(ii) based on said recorded associations, determine a pattern of deviation in said performance indicator attributable to one or more of said sequences of call handling treatments; and (iii) alter the plurality of available sequences of call handling treatments by making a change in the available sequences of treatments selected from:
- promoting a call handling treatment to an earlier point in one or more of said available sequences;
- demoting a call handling treatment to a later point in one or more of said available sequences; and
- removing a sequence of call handling treatments from the available sequences;
- adding a call handling treatment to one of said available sequences; and
- altering a weighting associated with a sequence of call handling treatments to thereby influence the frequency with which that sequence is selected from among the available sequences.

There is also provided a computerised call-handling system for providing call handling treatments in sequence to callers interacting with said system, the system comprising:

(a) a set of rules stored in memory for selecting a sequence of call handling treatments, from among a plurality of available sequences of call handling treatments, to be provided to each of a plurality of callers interacting with said system;

(b) a call handling treatment server for serving said treatments from storage to said callers in accordance with the one or more workflows;

(c) a performance indicator monitor for monitoring a measurable performance indicator associated with the behavior of the callers;

(d) processing means programmed to determine an association between said performance indicator and one or more of said call handling treatments provided to the callers; (d) a record for recording said association;

(e) processing means programmed to determine from said record a pattern of deviation in said performance indicator attributable to one or more of said sequences of call handling treatments; and (f) a workflow manager operable to alter the plurality of available sequences of call handling treatments by making a change in the available sequences of treatments selected from:
- promoting a call handling treatment to an earlier point in one or more of said available sequences;
- demoting a call handling treatment to a later point in one or more of said available sequences; and
- removing a sequence of call handling treatments from the available sequences;
- adding a call handling treatment to one of said available sequences; and
- altering a weighting associated with a sequence of call handling treatments to thereby influence the frequency with which that sequence is selected from among the available sequences.

BRIEF DESCRIPTION OF THE DRAWINGS

The invention will now be further illustrated by the following descriptions of embodiments thereof, given by way of example only with reference to the accompanying drawings, in which.

DETAILED DESCRIPTION OF PREFERRED EMBODIMENTS

Figure 1:
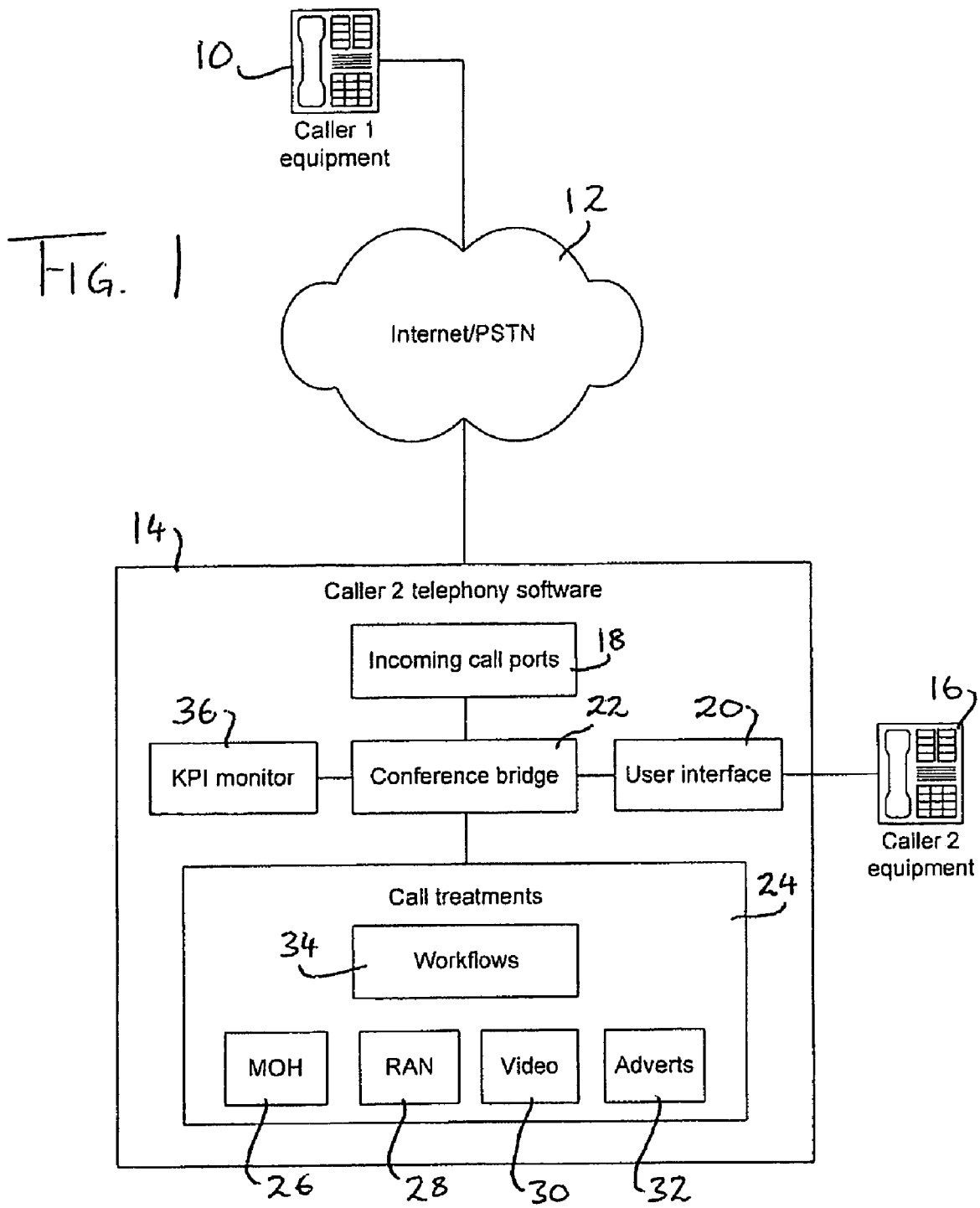
FIG. 1 is a schematic network architecture of a first embodiment.

FIG. 1 shows a simplified environment enabling calls to be made between first and second callers. The telephony equipment of a first caller 10 is connected to the Internet or the public switched telephone network (PSTN) 12. The Caller 1 equipment 10 is illustrated schematically as a telephone handset, but may be any voice or video telephony equipment, including voice over Internet protocol (VOIP) enabled handset, a legacy telephone handset connected to the PSTN, a legacy telephone handset connected to a private branch exchange with a direct connection to the PSTN or a gateway to the Internet, a "soft phone" application providing telephony functionality to a user of a computer, a cell phone or mobile telephone connected to a cellular network, to give just a few examples. The only requirement for this equipment is that it provides telephony functionality to a user across a network.

The other user, Caller 2, is connected to the network 12 using telephony software 14 which interacts with the actual hardware 16 employed by Caller 2. The telephony software 14 provides one or more incoming call ports 18 which can receive inbound telephone sessions or can initiate outbound telephony sessions. A live telephony session on one of these ports 18 can be connected through to the caller equipment 16 via a user interface 20 and a conference bridge 22.

However, in addition to providing direct contact between Caller 1 and Caller 2, the conference bridge 22 may also connect Caller 1 to any one of a number of call treatments provided by a module 24 of the software which manages such call treatments. The call treatments may be selected from any useful or suitable such treatments, including music on hold (MOH) 26, recorded announcements (RAN) 28, video streaming 30 or advertisements 32. Other call treatments will suggest themselves to the skilled person and these four examples are not intended to be limiting.

The decision as to how and when the call treatments are provided to telephony sessions at the incoming call ports 18 is made by reference to one or more stored workflows stored in a workflow memory area 34. Each new call or communications session triggers the operation of a workflow 34 which is effectively a set of programmed rules specifying the conditions under which, and the order in which, the various call treatments 26-32 are served to the user.

In a very simple embodiment, the workflow may specify that when Caller 2 equipment 16 is already engaged in an existing telecommunications session, any new incoming calls are held at the conference bridge and music on hold 26 is provided to the caller, optionally with one or more recorded announcements 28 asking the caller to be patient. In circumstances where the user of Caller 2 equipment operates a small business, advertisements 32 might be served intermittently to a caller on hold. The actual number, nature, and order of service of these treatments is entirely at the discretion of the system designer or may be configured by the user.

Alternatively, the workflow might be programmed to check whether a flag has been set to indicate that the Caller 2 equipment 16 is unattended, and if so, a different recorded announcement may be selected from the RAN store 28 to play to the user as an "out of office" recording. The Caller 2 telephony software is also provided with a key performance indicator (KPI) monitor 36, the functionality of which will be described below in greater detail.

The Caller 2 telephony software may be provided as a recorded program on a program carrier, or it may be stored in a storage medium associated with a computer or workstation having a processor suitable to operate the functionality of call treatments 24, user interface 20, and to control the hardware of conference bridge 22 and incoming call ports 18. The software may be implemented in a dedicated processor, or it may run on a general purpose processor. The processor may be a single processor or it may be distributed within a network of processing devices.

Figure 2:
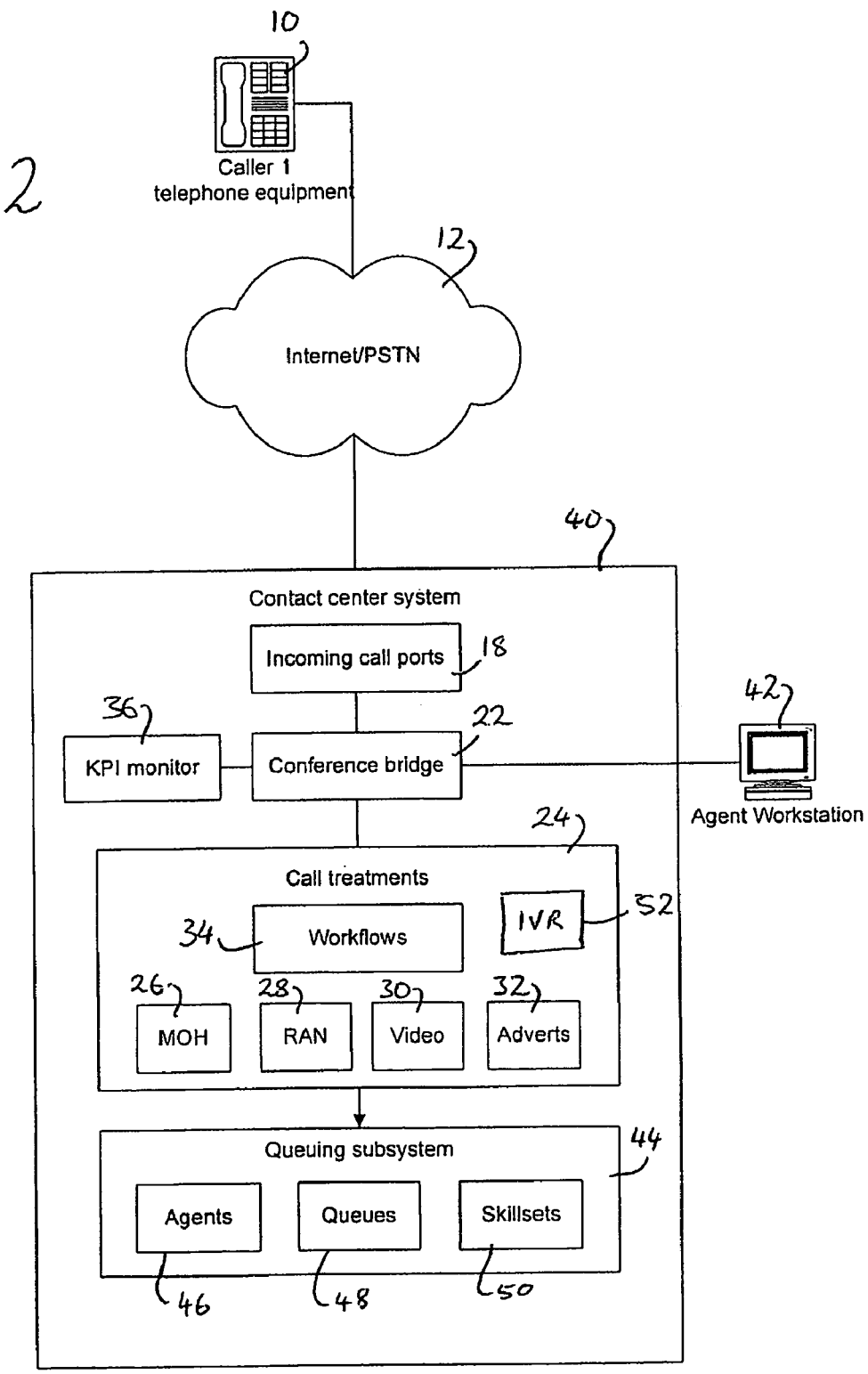
FIG. 2 is a schematic network architecture of a first embodiment.

Before describing the functionality of KPI monitor 36, reference will be made to an alternate environment, shown in FIG. 2, in which the Caller 1 equipment 10 connects across the Internet or PSTN 112 to a contact center 40. The contact center 40 (also referred to colloquially as a call center) operates generally in the manner well known in the art. Thus, the user at Caller 1 equipment 10 can be placed into contact with an agent provided at one of a number of agent workstations 42. Only one agent workstation is shown for simplicity, it being understood that in practice a large number of agents will be provided with workstations connected to the call center system via a local area network or wide area network (not shown).

Rather than connecting immediately to an agent, incoming calls are typically queued to an agent selected as the most suitable available agent in accordance with a queuing subsystem 44 which manages the resources of the contact center, such as by keeping track of the current status and availability of each agent in an agent resource system 46, by operating a number of queues of contact 48, and by managing various skillsets 50 which are associated with individual agents and with the queues 48. The skilled person will be aware that there are many ways of operating a contact center, which may not rely on skillsets and which may implement different types of queuing. The invention is not limited to any particular implementation.

Before queuing a contact to an agent, the contact will typically be served with one of a number of call treatments. As with the embodiment of FIG. 1, the call treatments 24 are served in accordance with programmed workflows 34 and again include music on hold 26, recorded announcements 28, video 30, advertisements 32 and, in addition, an interactive voice response application 52 which operates to play recorded messages in accordance with a hierarchical structure through which the user navigates by making appropriate responses. The inputs of the user are provided to the queuing subsystem in order to better determine the most appropriate queue for the call.

The contact center 40 is also provided with a KPI monitor 36, the functionality of which will now be described.

When a new call is received, step 60, either by the Caller 2 telephony software 14 or by the contact center 40 (it being understood that the operation of KPI monitor may be similar in both cases), one or more treatments are provided sequentially in accordance with the workflows 34, step 62, as previously described.

The KPI monitor 36 is connected to the conference bridge and "listens" in on each live communications session posted by the bridge. Accordingly, the KPI monitor can keep track of which treatment (if any) is currently being played to a caller, and can detect if a call is abandoned before being connected to either Caller 2 telephony equipment 16 (FIG. 1) or agent workstation 42 (FIG. 2), respectively.

When the KPI monitor detects that a call is abandoned, step 64, it updates a record or file of a computer system, known as the abandonment record, with an indication of at least the last treatment played to the caller, step 66. The abandonment record may also include a history of all treatments played to the caller during that session.

As each new abandonment is noted, a process running on the KPI monitor makes an evaluation as to whether the rate of abandonment for the last-played treatment or the combination of treatments played to that caller is considered to be significant. In general, the programmer of the system will specify what is considered to be "significant", typically as a percentage variation from a predetermined norm.

Thus if, over time, the number of calls abandoned during one particular treatment (for example, while the song "Greensleeves" is playing as music on hold), then this will be noted when a predetermined threshold has been breached. If the outcome of the decision 68 is negative, i.e. not significant, then no action is needed, step 70, and the process iterates with the next new call, step 60.

If, however, it is determined that the rate of abandonment is significant for a particular treatment, then a further decision is taken as to whether these call abandonments would improve the service level if the treatment in question were to be promoted to an earlier point in the workflow, decision 72.

As an example of where this determination might be positive, a recorded announcement might be flagged with metadata indicating it to be a "service announcement" in a service provider's contact center (for example, an announcement that a network problem affecting a particular set of subscribers is being repaired and will be fixed within an hour). If there is a high rate of abandonment upon playing this service announcement, then the likelihood is that promoting this announcement to an earlier point in the workflow will increase the number of within threshold abandons and will improve the service level.

As an example of where the service level might be disimproved, many contact centers will have service level rules indicating that any abandonment of a call is to be viewed as negative, e.g. if the purpose of the contact center is to encourage new subscriptions after having spoken with an agent, so that there is no benefit in call abandonment. In such cases, if a particular piece of music on hold results in a higher than average level of abandons, then the service level would not be improved by promoting this treatment in decision 72.

If the determination in decision 72 is positive, the treatment is flagged for promotion on the next rebuild of the workflow, step 74. Conversely, if a determination in decision 72 is negative, then the treatment is flagged for deletion or demotion, step 76. Upon the next rebuild of the workflow (which may happen immediately, or periodically, or only upon manual instruction), the workflow will be rebuilt to include the flagged changes, ie by promoting, demoting or deleting the treatment in question as appropriate, step 78. Such rebuilding will typically occur by reordering the sequence in which treatments are provided to customers, subject to programmed constraints (such as, for example, to only ever play MOH, RAN and advertisements during the "on hold" part of a call after an IVR session is complete).

Figure 4:
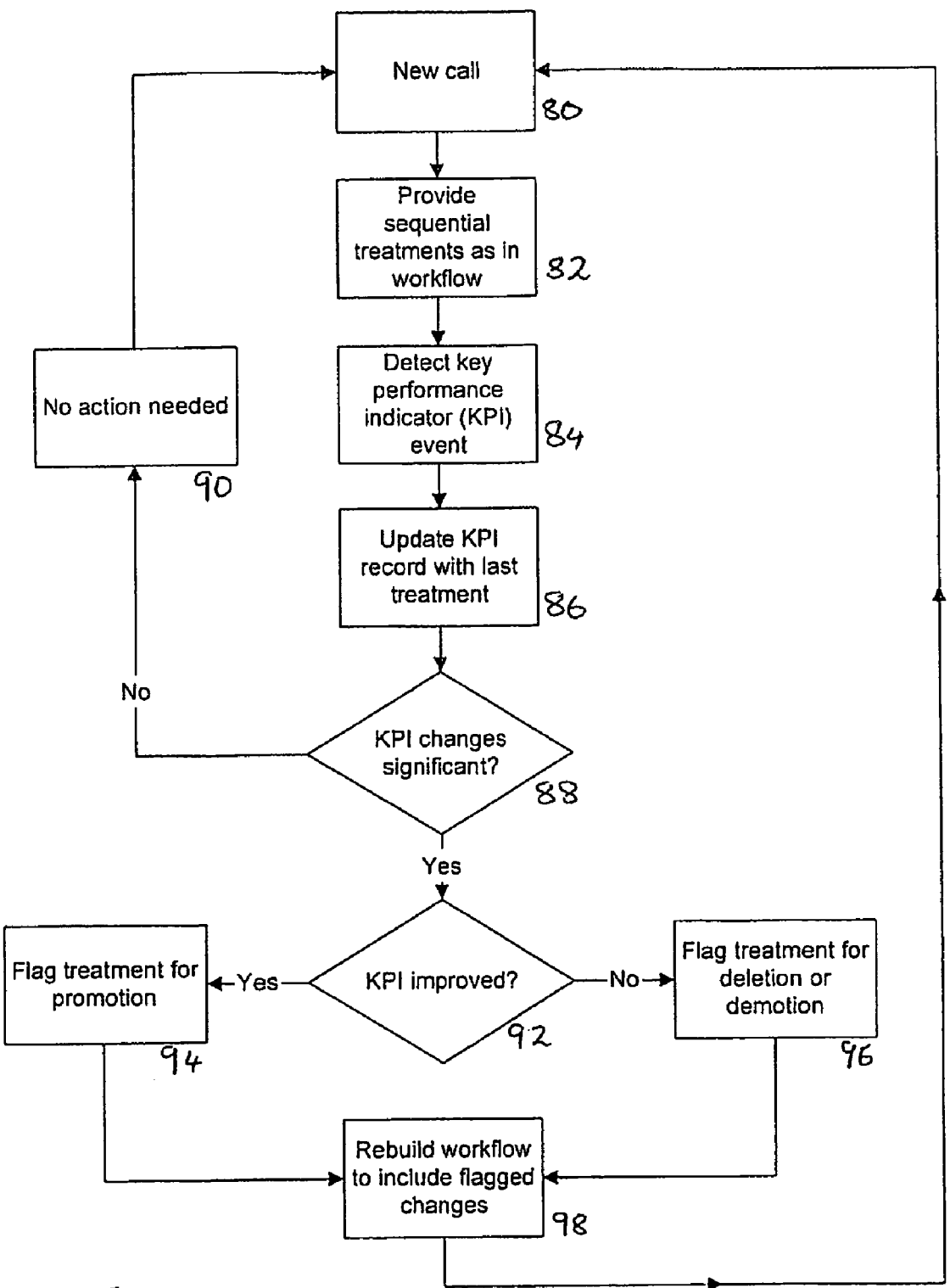
FIG. 4 is a second workflow showing a process for managing workflows based on key performance indicators.

FIG. 4 shows a workflow operating in the KPI monitor which is generalised to look beyond simple call abandonment as a key performance indicator. For example, the KPI monitor may receive an input from an agent workstation 42 in a contact center whenever a successful sale is made, or when the agent has managed to sell an ancillary service or product in addition to a main product (e.g. selling not only a computer system, but also ancillary software such as anti virus or office productivity software). In this workflow, the monitoring of such a KPI can be associated with the treatments which had been played to the caller, in order to determine positive and negative correlations.

Figure 3:
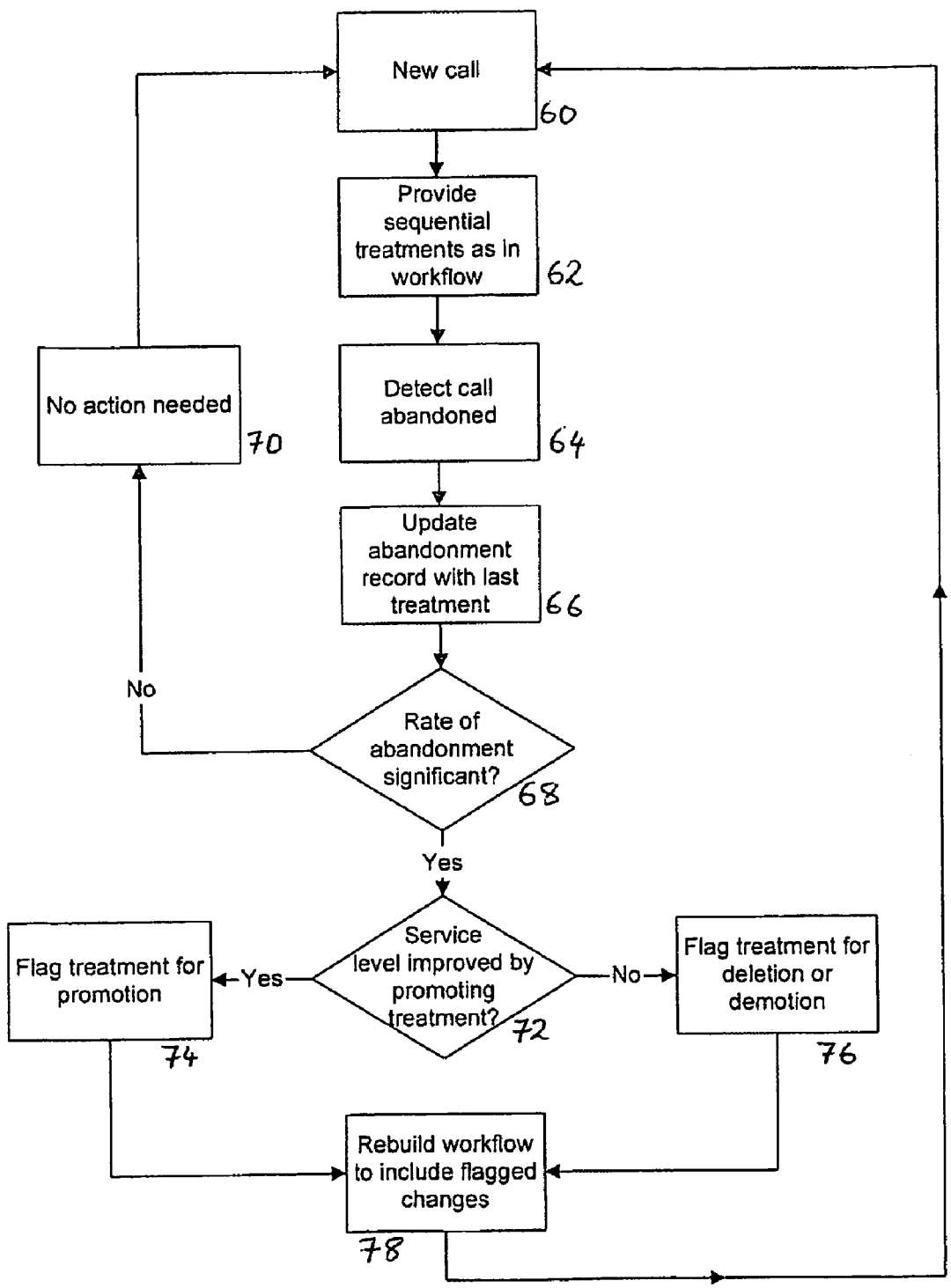
FIG. 3 is a first workflow showing a process for managing workflows based on abandonments.

Thus, in step 80, a new call is received at a contact center, and treatments are provided sequentially in accordance with a workflow, step 82. Upon detection of a key performance indicator event, step 84, the KPI record (equivalent to the abandonment record described in respect of FIG. 3), is updated with details of the last treatment, or of the history of treatments provided to that caller, step 86, along with relevant details of the KPI event (total sales dollar amount, or identifier of product(s) sold, or the fact that the caller was ultimately referred to a supervisor).

If in decision 88, the cumulative correlation between KPIs and treatments are evaluated for significance. If they are not evaluated as having been significant (i.e. the treatments played to a set of callers do not have a statistically positive or a negative correlation with a measured KPI) then no action is needed, step 90 and the process reverts to step 80.

If, however, the KPI changes are evaluated as significant in accordance with the programmed rules for such an evaluation, then the process proceeds to decision 92, in which an evaluation is made as to whether the treatments have improved the KPI or not.

If the KPI is improved, such as for example if a positive correlation is noted between ancillary sales and the playing of a particular advertisement, or the playing of a particular piece of music prior to an IVR session, then in step 94 the treatment providing the positive influence is flagged for promotion.

If, on the other hand, the evaluation in decision 92 is negative, then the treatment which has been correlated with the negative impact on KPI is flagged for deletion or demotion. The workflow is then rebuilt in step 98 to include these flagged changes, either immediately, or at a later point in time.

Figure 5:
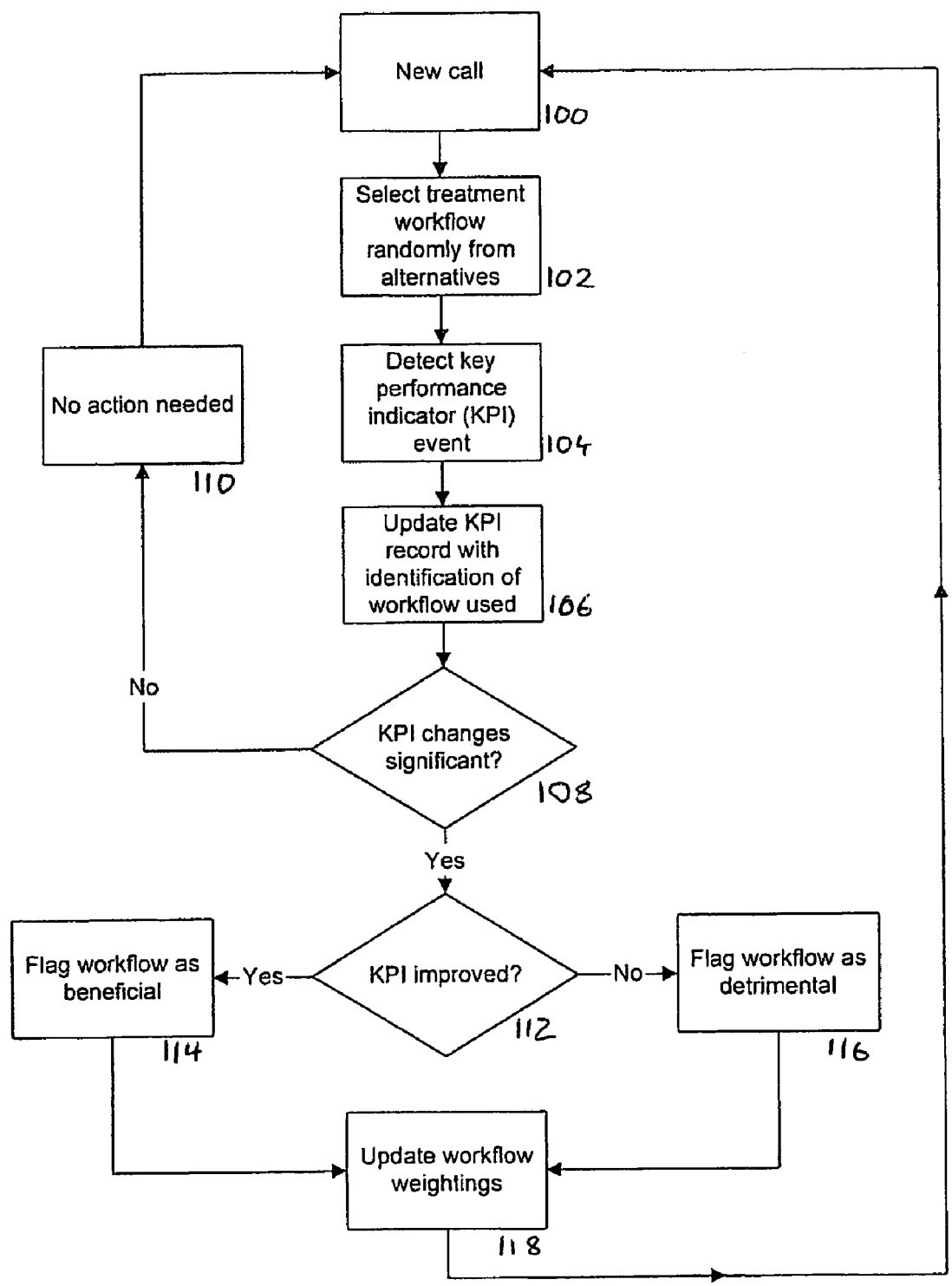
FIG. 5 is a third workflow showing a process for managing workflows based on key performance indicators.

In FIG. 5, a system and method is illustrated in which the workflows are "trained" by learning from previous experiences as to which workflows or workflow elements have the most positive outcome on one or more KPIs.

A new call 100 is received at a contact center. In step 102, a workflow is selected at random from a set of alternatives. The alternatives may be a discrete number of alternative workflows (for example there might be six workflows all differing only in the content of a particular recorded announcement or in the ordering of various announcements), or the workflows may be constructed at random from a predefined set of treatments.

The selection of a workflow at random, or the random selection of treatments within a workflow will preferably include weightings assigned to particular workflows or treatments so that the workflows with the highest weightings have the greatest chance of selection.

During the call, one or more key performance indicator events are detected by the KPI monitor, step 104. The KPI record is updated with an identification of the workflow used, or the components of the workflow randomly selected to be played to the customer, step 106.

If the changes to the KPI record are evaluated as not indicating any significant changes to the correlation between KPI and treatments, decision 108, then no action is needed, step 110. If, however, the outcome of the determination in decision 108 is positive, then a further decision is taken as to whether the KPI is improved in a manner which is attributable to the treatments used, decision 112. If the KPI is improved, then the workflow is flagged as having been beneficial, step 114. If not, the workflow is flagged as being detrimental, step 116.

In suitable embodiments, every outcome of every call may be taken as being significant in decision 108, so that a running process updates every workflow as being either beneficial or detrimental in accordance with a measured KPI, at the conclusion of each call. Alternatively, such flagging can occur after accumulation of a number of observations. In step 118, the workflow weightings are updated in accordance with the flags placed in steps 114 and 116, with the result that on the next iteration, the beneficial workflows are more likely to be selected and the detrimental workflows less likely.

Alternatively, step 118 can be replaced by a decision to exclude from future iterations any particularly detrimental workflows or combination of treatments, or alternatively, to select only particularly beneficial workflows in future iterations.

The evaluation of KPI changes as being significant may be done in a granular fashion, with particular sets of customers evaluated separately from one another. As an example, customers may be grouped by geographical location, or age, or gender, or product interest, or dialled number, with an evaluation being made to note a particularly beneficial or detrimental effect attributable to a particular treatment of combination of treatments for that group.

As an example, a particular recorded announcement may cause offence to members of a certain gender or geographical grouping, or any other measurable grouping. In such cases, the workflows may be tailored to avoid playing that treatment to that particular grouping on future calls. Similarly, it may be found that by playing a different combination of treatments to a particular group of callers, sales are increased, whereby one can build a more granular and targeted set of workflows in an automated fashion for each group of callers based on the KPI monitor.

The invention is not limited to the embodiment(s) described herein but can be amended or modified without departing from the scope of the present invention.

We claim:

1. A computer-implemented method of managing the provision of call handling treatments in sequence to callers interacting with an automated call-handling system, the method comprising the steps of:
   (i) for each of a plurality of callers interacting with said automated call handling system:
      (a) providing a sequence of call handling treatments to the caller in accordance with one or more workflows;
      (b) monitoring a measurable performance indicator associated with that caller's behavior;
      (c) determining an association between said performance indicator and one or more of said call handling treatments provided to said caller; and
      (d) recording said association;
   (ii) based on said recorded associations, determining a pattern of deviation in said performance indicator attributable to one or more of said call handling treatments; and
   (iii) altering the or each workflow in response to said pattern of deviation by making a change in the or each workflow selected from:
      promoting a call handling treatment to an earlier point in the workflow;
      demoting a call handling treatment to a later point in the workflow;
      adding a call handling treatment to the workflow; and
      removing a call handling treatment from the workflow.

2. A computer-implemented method according to claim 1, wherein said workflow is stored in a memory associated with said call handling system.

3. A computer-implemented method according to claim 1, wherein the measurable performance indicator is a time at which a call termination event is detected.

4. A computer-implemented method according to claim 1, wherein the performance indicator is a metric received from an associated computerised system which interfaces with the call handling system, whereby an event within that associated system is notified to the call handling system and is monitored as a performance indicator.

5. A computer-implemented method according to claim 4, wherein said associated computerised system is a contact center agent application operated by agents of a contact center to record details of an interaction with a caller.

6. A computer program product comprising instructions recorded on a non-transitory program carrier which, when executed in a computerised call handling system, are effective to cause said system to:
   (i) for each of a plurality of callers interacting with said automated call handling system:
      (a) provide a sequence of call handling treatments to the caller in accordance with one or more workflows;
      (b) monitor a measurable performance indicator associated with that caller's behavior;
      (c) determine an association between said performance indicator and one or more of said call handling treatments provided to said caller; and
      (d) record said association;
   (ii) based on said recorded associations, determine a pattern of deviation in said performance indicator attributable to one or more of said call handling treatments; and
   (iii) alter the or each workflow in response to said pattern of deviation by making a change in the or each workflow selected from:
      promoting a call handling treatment to an earlier point in the workflow;
      demoting a call handling treatment to a later point in the workflow;
      adding a call handling treatment to the workflow; and
      removing a call handling treatment from the workflow.

7. A computerised call-handling system for providing call handling treatments in sequence to callers interacting with said system, the system comprising:
   (a) a memory storing one or more workflows specifying a sequence of call handling treatments to be provided to each of a plurality of callers interacting with said system;
   (b) a call handling treatment server for serving said treatments from storage to said callers in accordance with the one or more workflows;
   (c) a performance indicator monitor for monitoring a measurable performance indicator associated with the behavior of the callers;
   (d) processing means programmed to determine an association between said performance indicator and one or more of said call handling treatments provided to the callers;
   (d) a record for recording said association;
   (e) processing means programmed to determine from said record a pattern of deviation in said performance indicator attributable to one or more of said call handling treatments; and
   (f) a workflow manager operable to alter the or each workflow in response to said pattern of deviation by making a change in the or each workflow selected from:
      promoting a call handling treatment to an earlier point in the workflow;
      demoting a call handling treatment to a later point in the workflow;
      adding a call handling treatment to the workflow; and
      removing a call handling treatment from the workflow.

8. A computerised call-handling system according to claim 7, wherein said call-handling system provides an interface to callers interacting with a contact center.

9. A computer-implemented method of managing the provision of call handling treatments in sequence to callers interacting with an automated call-handling system, the method comprising the steps of:
   (i) for each of a plurality of callers interacting with said automated call handling system:
      (a) providing a sequence of call handling treatments, selected from among a plurality of available sequences of call handling treatments, to the caller;
      (b) monitoring a measurable performance indicator associated with that caller's behavior;
      (c) determining an association between said performance indicator and one or more of said call handling treatments provided to said caller; and
      (d) recording said association;
   (ii) based on said recorded associations, determining a pattern of deviation in said performance indicator attributable to one or more of said sequences of call handling treatments; and
   (iii) altering the plurality of available sequences of call handling treatments by making a change in the available sequences of treatments selected from:
      promoting a call handling treatment to an earlier point in one or more of said available sequences;
      demoting a call handling treatment to a later point in one or more of said available sequences;
      removing a sequence of call handling treatments from the available sequences;

adding a call handling treatment to one of said available sequences; and altering a weighting associated with a sequence of call handling treatments to thereby influence the frequency with which that sequence is selected from among the available sequences.

10. A computer-implemented method according to claim 9, wherein said sequences of treatments are provided as a closed set of treatments, with each caller being provided with a sequence from among said closed set.

11. A computer-implemented method according to claim 9, wherein the selection of a sequence of call handling treatments for a particular caller is determined in accordance with a schedule.

12. A computer-implemented method according to claim 9, wherein the selection of a sequence of call handling treatments for a particular caller is determined at random.

13. A computer-implemented method according to claim 9, wherein the selection of a sequence of call-handling treatments for a caller is made subject to weightings according to which certain sequences are selected more frequently than others.

14. A computer-implemented method according to claim 9, wherein the sequences of treatments are constructed dynamically by amalgamating a number of treatments according to predetermined constraints.

15. A computer-implemented method according to claim 14, wherein the frequency with which treatments are selected for amalgamation is made subject to weightings assigned to such treatments.

16. A computer program product comprising instructions recorded on a non-transitory program carrier which, when executed in a computerised call handling system, are effective to cause said system to:
 (i) for each of a plurality of callers interacting with said automated call handling system:
  (a) provide a sequence of call handling treatments, selected from among a plurality of available sequences of call handling treatments, to the caller;
  (b) monitor a measurable performance indicator associated with that caller's behavior;
  (c) determine an association between said performance indicator and one or more of said call handling treatments provided to said caller; and
  (d) record said association;
 (ii) based on said recorded associations, determine a pattern of deviation in said performance indicator attributable to one or more of said sequences of call handling treatments; and
 (iii) alter the plurality of available sequences of call handling treatments by making a change in the available sequences of treatments selected from:
  promoting a call handling treatment to an earlier point in one or more of said available sequences;
  demoting a call handling treatment to a later point in one or more of said available sequences;
  removing a sequence of call handling treatments from the available sequences;
  adding a call handling treatment to one of said available sequences; and
  altering a weighting associated with a sequence of call handling treatments to thereby influence the frequency with which that sequence is selected from among the available sequences.

17. A computerised call-handling system for providing call handling treatments in sequence to callers interacting with said system, the system comprising:
 (a) a set of rules stored in memory for selecting a sequence of call handling treatments, from among a plurality of available sequences of call handling treatments, to be provided to each of a plurality of callers interacting with said system;
 (b) a call handling treatment server for serving said treatments from storage to said callers in accordance with the one or more workflows;
 (c) a performance indicator monitor for monitoring a measurable performance indicator associated with the behavior of the callers;
 (d) processing means programmed to determine an association between said performance indicator and one or more of said call handling treatments provided to the callers;
 (d) a record for recording said association;
 (e) processing means programmed to determine from said record a pattern of deviation in said performance indicator attributable to one or more of said sequences of call handling treatments; and
 (f) a workflow manager operable to alter the plurality of available sequences of call handling treatments by making a change in the available sequences of treatments selected from:
  promoting a call handling treatment to an earlier point in one or more of said available sequences;
  demoting a call handling treatment to a later point in one or more of said available sequences;
  removing a sequence of call handling treatments from the available sequences;
  adding a call handling treatment to one of said available sequences; and
  altering a weighting associated with a sequence of call handling treatments to thereby influence the frequency with which that sequence is selected from among the available sequences.

\* \* \* \* \*